S. B. CLAY.
REAMING MACHINE.
APPLICATION FILED AUG. 30, 1920.
1,408,341.
Patented Feb. 28, 1922.
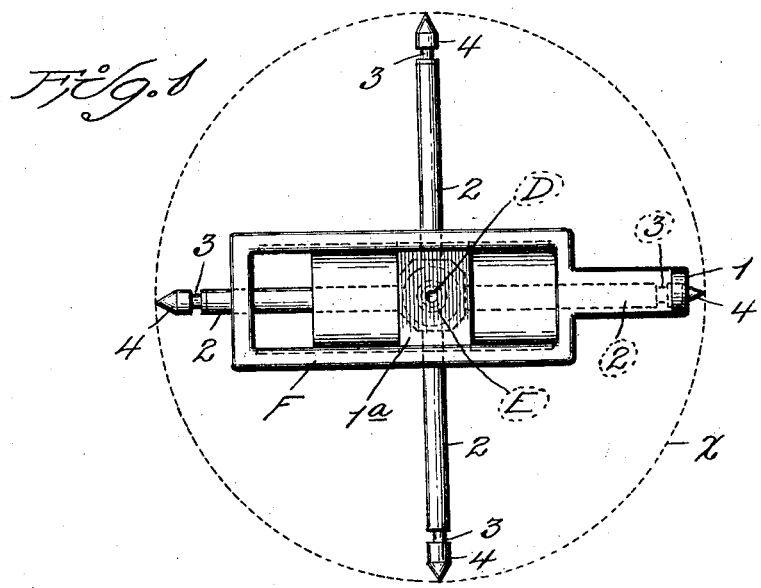
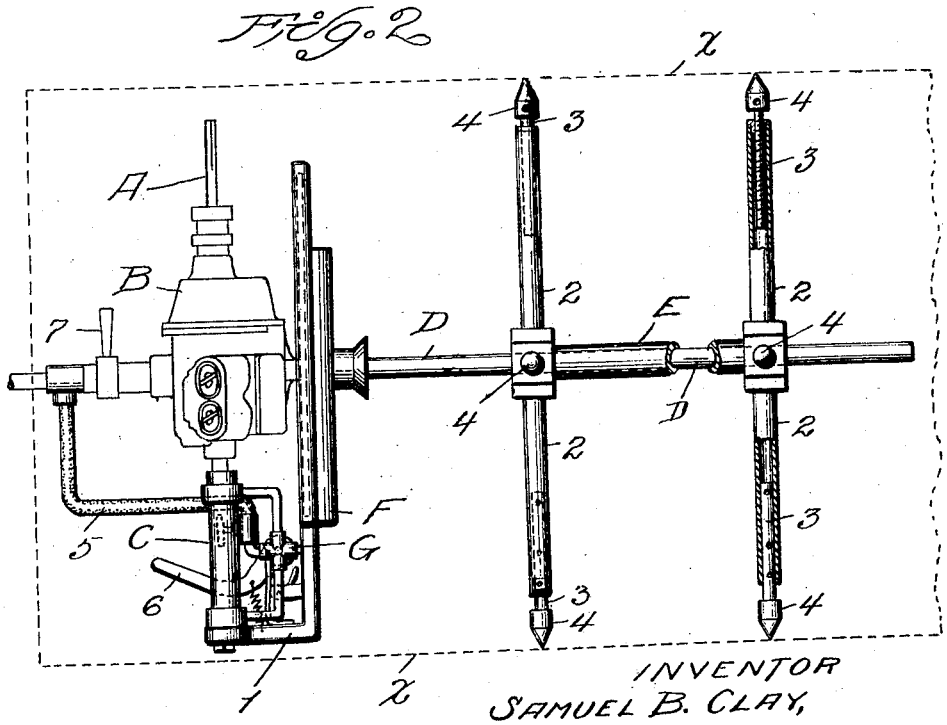
INVENTOR
SAMUEL B. CLAY,
by Bakewell & Church ATTORNEYS.

UNITED STATES PATENT OFFICE.

SAMUEL B. CLAY, OF ST. LOUIS, MISSOURI, ASSIGNOR TO HEINE SAFETY BOILER COMPANY, OF ST. LOUIS, MISSOURI, A CORPORATION OF MISSOURI.

REAMING MACHINE.

1,408,341.  Specification of Letters Patent.  Patented Feb. 28, 1922.

Application filed August 30, 1920. Serial No. 406,786.

*To all whom it may concern:*

Be it known that I, SAMUEL B. CLAY, a citizen of the United States, residing at St. Louis, Missouri, have invented a certain new and useful Improvement in Reaming Machines, of which the following is a full, clear, and exact description, such as will enable others skilled in the art to which it appertains to make and use the same.

This invention relates to boring or reaming machines, and has for its main object to provide an efficient machine capable of being arranged on the inside of a boiler shell or other cylindrical tubular object and constructed in such a manner that it will hold the cutting tool steady and radial with respect to the shell and force said tool outwardly through the shell.

Another object is to provide an internal reaming or boring machine in which the cutting tool can be easily moved longitudinally of the object inside of which the machine is arranged and also revolved or swung about the longitudinal axis of said object so as to position said tool at any desired point on the inner surface of said object. And still another object is to provide a supporting mechanism for a power-operated reamer that makes it possible for a single workman located inside of a boiler shell to accurately ream holes in the shell.

Other objects and desirable features of my invention will be hereinafter pointed out.

Figure 1 of the drawings is a front elevational view of the supporting structure of my improved machine with the air motor and the operating cylinder for said motor removed; and Figure 2 is a side elevational view of the complete machine.

Briefly described, my invention consists of a rotatable cutting tool A, such for example, as a drill or reamer, a means for rotating said tool, herein shown as an air motor B or other suitable motor, an adjustable supporting structure for said motor adapted to be arranged inside of a boiler shell or other cylindrical tubular object for holding the tool A radially with relation to the inner surface of the shell, and a cylinder C provided with a piston for bodily moving the motor B so as to feed the tool A through the work and withdraw said tool from the work. The supporting structure that carries the motor B and the cylinder C is constructed in such a manner that the tool A can be shifted longitudinally of the shell inside of which the machine is arranged and also revolved or swung about the longitudinal axis of the shell. Said supporting structure is also designed so that it can be adjusted easily to adapt it to boiler shells or cylindrical tubular objects of different diameters. The supporting structure above referred to preferably consists of a shaft D arranged longitudinally of and at the center of the boiler shell or other tubular object $x$ inside of which the machine is arranged, a tubular bearing E partly broken away in Figure 2, in which the shaft D is mounted in such a manner that it can be revolved and also moved longitudinally of said bearing, a frame or head piece F on one end of said shaft D which is provided with a bracket 1 that carries the cylinder C, and a sliding block or support 1ª in the frame F to which the motor B is rigidly connected. The shaft bearing E is provided with means that holds said bearing E stationary and centered with relation to the shell or object on which the tool A of the machine operates, and while said means can be constructed in various ways without departing from the spirit of my invention, I prefer to provide the shaft bearing E with two sets of radially-disposed arms, rigidly connected to said bearing and having their outer ends bearing against the inner side of the shell $x$. The arms that support and center the shaft bearing E are preferably constructed in such a manner that they can be shortened and lengthened so as to adapt the machine to boiler shells or tubular objects of different diameters, and also to securely clamp or connect the supporting structure of the machine to the shell when the machine is in use. Preferably, the arms at the ends of the shaft bearing E are formed by radially disposed tubular members 2 provided with adjustable extensions 3 equipped at their outer ends with sharp pointed heads 4 that bear against the inner side of the shell. The adjustable extensions of some of the arms of each set of arms can be retained in position by bolts that pass through aligned holes in the tubular members 2 of the arms and in the adjustable extensions in said members 2 and the adjustable extensions of the other arms of the set can be externally screw-threaded and mounted in nuts or internally screw-threaded devices in the tubular members 2 that carry said extensions, as shown in Figure 2.

An operating medium, such as air under pressure, is supplied to the cylinder C through a flexible tube 5, and the admission and exhaust of said operating medium to and from said cylinder is controlled by a valve G whose stem is provided with a handle 6. To position the tool A at any desider point on the interior of the shell a it is only necessary for the operator to shift the shaft D longitudinally of its supporting bearing E so as to arrange the tool in a vertical plane passing through the point where the tool is to act on the shell, and then revolve the shaft D so as to bring the tool directly opposite said point. Thereafter the operator moves the handle 6 of the controlling valve so as to admit the operating medium to the cylinder C, and thus cause the motor B to move outwardly towards the shell.

The motor B is set in operation by manipulating the handle 7 of the valve which controls the supply of operating medium to said motor, and during the cutting operation the tool A is forced outwardly through the shell by the outward pressure which the piston of the cylinder C exerts on the motor B. At the completion of the cutting operation the operator moves the handle 6 of the controlling valve in the opposite direction so as to cause the motor B to move inwardly towards the center of the shell and thus withdraw the tool A from the work.

With a machine of the construction above described it is possible for a single workman located inside of a boiler shell to accurately ream holes in the shell, due to the fact that the tool A of the machine is supported in such a manner that it will be held steady and radially disposed with respect to the shell during the cutting operation, and it can be moved easily longitudinally of the shell and also revolved about the longitudinal axis of the shell, so as to arrange the tool at any desired point on the inner surface of the shell.

In the actual operation of the machine the supporting structure which carries the shaft D is arranged adjacent one end of the shell, and after the holes in the end section of the shell have been reamed said supporting structure is released and moved longitudinally further into the shell so as to bring the tool A within range of the holes in the next section of the shell.

Having thus described my invention, what I claim as new and desire to secure by Letters Patent is:

1. A boring or reaming machine, comprising a supporting structure adapted to be arranged transversely on the inside of a tubular object, means for clamping or connecting said structure to said object, a part carried by said structure that extends longitudinally of said object, said part being adapted to be shifted longitudinally and also rotated around the longitudinal axis of said object, and a rotatable cutting tool carried by said part and disposed radially with respect to the tubular object on which it operates.

2. An internal boring or reaming machine, comprising a supporting structure adapted to be arranged transversely inside of a tubular object and secured to same, a rotatable cutting tool disposed radially with respect to said object and adapted to be forced outwardly through said object, and means cooperating with said supporting structure for carrying said tool and for permitting said tool to be shifted longitudinally of said object, transversely of said object, and also revolved bodily about the longitudinal axis of said object.

3. An internal boring or reaming machine comprising a removable supporting structure adapted to be arranged inside of a tubular object, a rotatable cutting tool adapted to be forced outwardly through said object, transversely of said object, means for detachably connecting said structure to said object, and a supporting means for said tool movably mounted on said supporting structure in such a manner that said supporting means and tool can be shifted longitudinally of said object.

4. An internal boring or reaming machine comprising a rotatable cutting tool adapted to be arranged inside of a tubular object and forced outwardly through same during the cutting operation, and means arranged inside of said object and detachably connected to same for supporting said tool and permitting said tool to be bodily shifted longitudinally of said object and also revolved about the longitudinal axis of said object without changing the position of said supporting means.

5. An internal boring or reaming machine comprising a supporting structure adapted to be arranged transversely inside of a tubular object, means for detachably connecting said structure to said object, a shaft mounted in said structure at the center of said object and arranged at right angles to said structure, said shaft being capable of being revolved and also shifted longitudinally of the object, a means carried by said shaft for operating a cutting tool, and a means for bodily shifting said tool operating means so as to carry the tool into and out of engagement with the work.

6. An internal boring or reaming machine comprising a supporting structure adapted to be arranged transversely inside of a tubular object and detachably connected to same, a shaft carried by said supporting structure and arranged longitudinally of said object, said shaft being capable of being rotated and also shifted longitudinally, a head piece on said shaft, and a motor support movably mounted on said head piece.

7. A supporting means for a power-operated drill or reamer comprising a tubular bearing adapted to be arranged inside of a tubular object, longitudinally of same, means for holding said bearing centered with relation to said object, a longitudinally shiftable shaft rotatably mounted in said bearing, a part connected to one end of said shaft and provided with a cylinder equipped with a piston, and a radially movable tool on said part adapted to be actuated by the piston of said cylinder.

8. An internal boring or reaming machine comprising a bearing adapted to be arranged longitudinally at the center of a tubular object, radially disposed arms projecting from said bearing and having their outer ends contacting with the object inside of which the bearing is arranged, a longitudinally shiftable shaft rotatably mounted in said bearing, and means on one end of said shaft for carrying a power-operated tool.

9. An internal boring or reaming machine comprising a bearing adapted to be arranged longitudinally inside of a tubular object, radially projecting arms branching from said bearing and provided with adjustable extensions for engaging the object inside of which the bearing is arranged, a longitudinally shiftable shaft rotatably mounted in said bearing, a right-angularly disposed head piece on one end of said shaft, a cylinder carried by said head piece, and a support for a power-operated tool slidably mounted on said head piece and adapted to move radially for the purpose described.

10. An internal reaming or boring machine, comprising a supporting structure adapted to be arranged inside of a tubular object and composed of a shaft bearing, and sets of radially disposed arms that branch from said bearing, said arms having adjustable extensions provided at their outer ends with sharp pointed devices that bear against the internal surface of said object, a longitudinally shiftable shaft rotatably mounted in said bearing, a head piece on one end of said shaft, a cylinder carried by said head piece, and a motor support slidably mounted in said head piece.

SAMUEL B. CLAY.